(No Model.) 2 Sheets—Sheet 1.

P. BALL.
ROTARY METER.

No. 404,374. Patented June 4, 1889.

Witnesses:
J. R. Barton
Ella P. Blemud

Inventor.
Phineas Ball
By Chas. H. Burleigh
Attorney (No Model.) 2 Sheets—Sheet 2.
P. BALL.
ROTARY METER.
No. 404,374. Patented June 4, 1889.
*Fig. 5.*
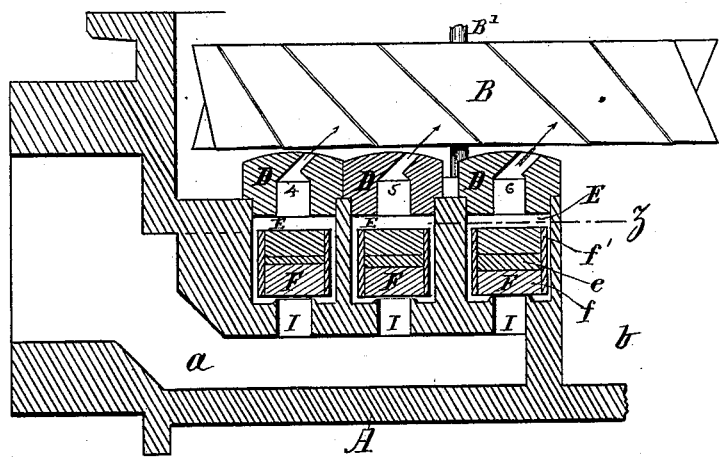
*Fig. 7.*    *Fig. 13.*    *Fig. 15.*    *Fig. 17.*
  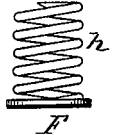 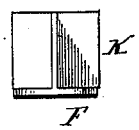
*Fig. 8.*    *Fig. 14.*    *Fig. 16.*    *Fig. 18.*
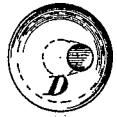 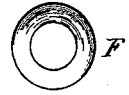  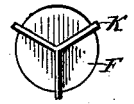
*Fig. 9.*    *Fig. 11.*
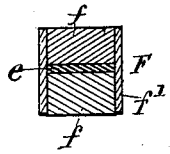 
*Fig. 6.*    *Fig. 12.*
*Fig. 10.* 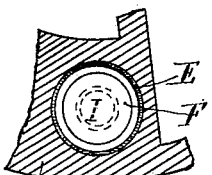 
Witnesses:      Inventor.
S. R. Barton      Phinehas Ball
Ella P. Blenus      By Chas. H. Burleigh
                                      Attorney

UNITED STATES PATENT OFFICE.

PHINEHAS BALL, OF WORCESTER, MASSACHUSETTS, ASSIGNOR TO THE UNION WATER METER COMPANY, OF SAME PLACE.

ROTARY METER.

SPECIFICATION forming part of Letters Patent No. 404,374, dated June 4, 1889.

Application filed January 2, 1889. Serial No. 295,155. (No model.)

*To all whom it may concern:*

Be it known that I, PHINEHAS BALL, a citizen of the United States, residing at Worcester, in the county of Worcester and State of Massachusetts, have invented certain new and useful Improvements in Meters for Gas or Fluids, of which the following, together with the accompanying drawings, is a specification sufficiently full, clear, and exact to enable persons skilled in the art to which this invention appertains to make and use the same.

The object of my present invention is to produce a gas or fluid meter or current-measuring apparatus, operating on the rotary principle, which shall be sufficiently accurate and reliable to meet the practical conditions of use when applied to the measurement of natural gas or like substances, or in other instances to the measurement of heavy fluid or liquids, as water, oils, &c; also, to provide in a rotary meter for gas or liquid a series of different delivery orifices or nozzles for directing the fluid or gas upon the vanes of the rotatable fan or wheel, and stop-valves of different weight disposed in relation thereto as hereinafter explained, for controlling the flow through the respective nozzles, and adapted for automatic operation in accordance with variations in the pressure or volume of flow to open the different orifices or nozzles to give greater or less area of passage, and thereby graduate the impact action upon the vaned wheel according to the volume of consumption. These objects I attain by mechanism the nature and operation of which are explained in the following description in detail, the particular subject-matter claimed being hereinafter definitely specified.

Figure 1:
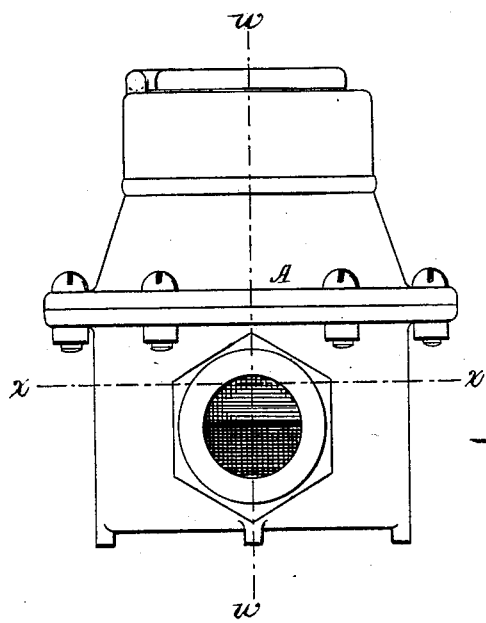
Figure 2:
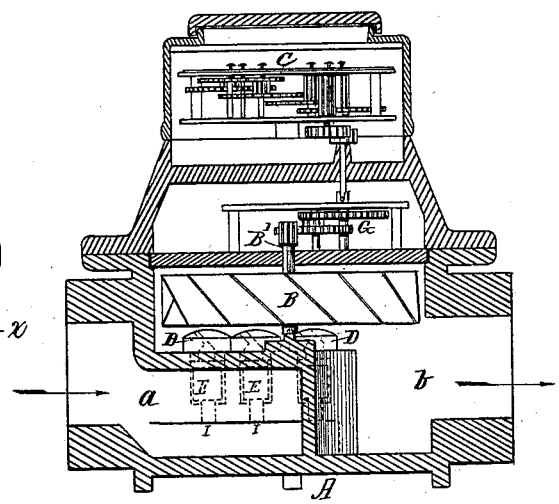
Figure 3:
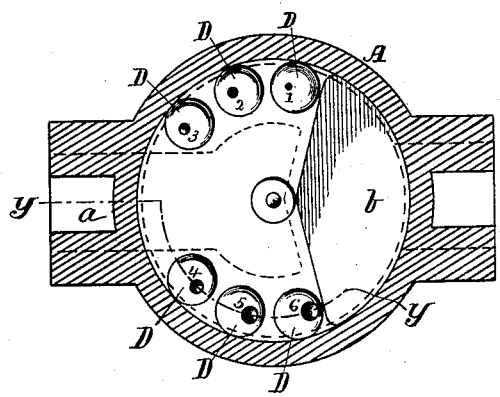
Figure 4:
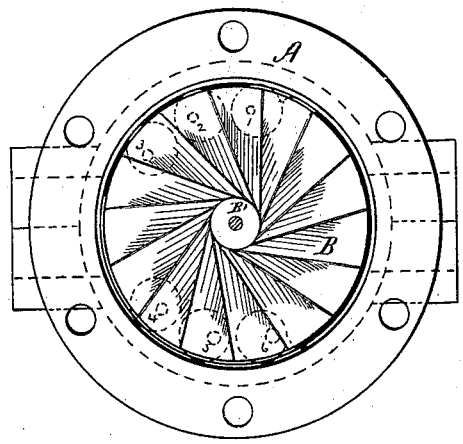

In the drawings, Figure 1 is an exterior end view of my improved meter. Fig. 2 is a longitudinal vertical section at line $w\ w$, Fig. 1. Fig. 3 is a horizontal section at line $x\ x$, Fig. 1. Fig. 4 is a plan view with the cap removed. Fig. 5 is a vertical section through the delivery-nozzles and valves at line $y\ y$, Fig. 3. Fig. 6 is a horizontal section through one of the valve-chambers at line $z$, Fig. 5. Figs. 7 and 8 show section and plan views of one of the delivery-nozzles or mouth-pieces. Figs. 9 and 10 show a section and plan of the valve. Figs. 11 to 18, inclusive, show modifications in the form of valves that may be employed.

In practice meters for the purposes above named are required to give approximately correct results under very unequal conditions, as from a very small stream or up to their full capacity, and to meet this varied requirement my invention employs certain peculiarly-arranged delivery-nozzles or valved mouth-pieces, as hereinafter explained, by which the passing currents are directed upon the meter-wheel in the most efficient manner.

In carrying out my invention I avail myself of the principle of the vaned wheel which has been so successfully used in the science of anemometry, and I combine with such vaned wheel, of any form suitable to measure the velocity of a flowing current, a series of delivery-nozzles or mouth-pieces, and provide for them pressure-resisting valves, the resisting capacity of which is adjusted in the respective valves so that said valves will successively open in accordance with the flow or degree of gas-pressure for delivering onto the wheel a concentrated current of greater or less volume, and in which the quantity and operative force bear comparatively constant ratio, thus avoiding extremes of high or low velocity in the current at the point of impingement and the resultant variation of impact force therefrom that would be occasioned by variations of pressure when acting through a single opening of fixed dimension.

In referring to parts, A denotes the case, body, or shell of the meter, which may be of any desired size and of any suitable shape for containing the working mechanism, or made to suit the purpose or situation of the apparatus or the taste of the manufacturer. Said case or body is provided with suitable bosses for the attachment of the supply and distributing pipes in connection with which the meter is to be used.

B indicates a revoluble measuring-wheel. Said wheel may be of any suitable or well-known construction, as most convenient or efficient for different pressures, conditions, or situations—as, for instance, the ordinary fan-wheel, cup-wheel, spiral vane, turbine, or a diagonal vaned wheel, as shown. As these wheels are all well-known types, no further description thereof is necessary. The wheel is mounted on a suitable arbor or spindle B' to rotate freely within the chamber of the case.

Reducing-gearing G is combined with the spindle or arbor B' of the wheel B in the ordinary manner, and a registering mechanism C is arranged to be operated thereby for indicating the measurement. These parts are of the usual type, and need no further explanation.

D indicates the mouth-pieces or delivery-nozzles arranged within the casing, and secured in the partition that separates the inlet-chamber $a$ from the outlet-chamber $b$, their delivery-orifices being arranged in a circular row or disposed in advantageous positions relatively to the wheel B. In the present instance I show six of these mouth-pieces D; but I do not confine myself to that particular number, as any convenient number (more or less) can be used, according to the desired capacity of the meter or requirements of service in any instance. The mouth-pieces or nozzles D are preferably made with their respective openings of different size or caliber, as indicated at 1, 2, 3, 4, 5, and 6 on Fig. 3, and said openings are best formed inclined and slightly conical, so as to cause the issuing gas or fluid to move in a solid or concentrated current or stream directly against the vanes of and not be splayed out before acting on the wheel B, thus exerting its most active and energetic force. The orifices are disposed in relation to the wheel in a manner to severally deliver their streams at positions of the greatest effectiveness, and are placed as near to the wheel as can be conveniently done.

Suitable chambers E are provided at the back of or beneath the mouth-pieces D, and within each of said chambers I arrange a valve or puppet, which closes in opposition to the direction of the inflowing current, which enters the chamber through an inlet I. The inlets I into the respective chambers E under the valves F are from the main inlet-chamber $a$ common to all the valve-chambers in the meter, said chamber $a$ being connected with the pipe which supplies the gas or fluid, while the chamber $b$ is connected with the pipe which leads to the place of delivery. The size of the chamber E is sufficiently greater than the valve F to allow free passage for the gas or fluid through the chamber when the valve is opened.

To make the impinging force the most active, the inlet-passages I to the chambers E are made relatively larger than the orifices through the delivery mouth-pieces D. The valves F are severally adjusted for resisting different degrees of pressure, and are arranged for opening automatically by the force or pressure of the gas whenever the difference of pressure between the inlet-chamber $a$ and outlet-chamber $b$ exceeds the amount of pressure or resistance to which the respective valves are adjusted. The pressure to which this first valve is adjusted is the minimum adjustment, and may correspond to one ounce, (more or less,) as of gas, or one foot pressure of water, (more or less.) The second, third, fourth, and succeeding valves are each adjusted to withstand a higher degree of pressure than the one preceding, or to respectively open when the duty demands a greater volume of gas or fluid to pass through the meter than can at nominal velocity pass through the smaller mouth. Thus the valve for mouth No. 1 gives minimum resistance, and the valve for mouth No. 6 gives the maximum resistance, while the valves of the intermediate numbered mouths give different intermediate degrees of resistance. By this arrangement the several nozzles or mouth-pieces D are caused to deliver according to pressure requirements or volume of consumption a forceful stream for impingement against the wheel B, the issuance being at a velocity sufficiently high to give proper rotation under minimum flow, and, on the other extreme, not so high as to force the wheel to excessive rotative velocity relatively to the volume of flow; hence the registering-power of the meter is maintained within practical limits and results of comparative accuracy are given. For instance, in a meter placed on a one-and-one-fourth-inch pipe, the demand of the consumer of gas or water may be only a stream of one-eighth-inch diameter. If this should be drawn through a meter of the usual construction in this class, the operating-wheel will not move, as the velocity of flow would be too slight to develop impact force sufficient to overcome the friction of the wheel and registering-gearing; but with my invention the quantity passing is concentrated within such limit as will give to the stream at the point of issue and impingement a velocity and power sufficient to operate the wheel.

In practice the valve F, for resisting the entrance of gas to the chamber E, is preferably a weighted cylinder, which can be formed with disks of cork $f$, or other equivalent soft material, confined within a metal ring or case $f'$, and with a disk of metal $e$, of greater or less thickness, inclosed therein for giving the required weight. (See Figs. 5, 9, and 10.)

It may sometimes be desirable to stop the smaller mouth or orifice when a larger one is opened, and for this purpose the valve F can be fitted at its top so as to close the delivery orifice or passage through the mouth-piece D by an excess of pressure that forces the lighter valve to the top of the chamber.

If preferred, the valve can be provided with projections $m$, (see Figs. 11 and 12,) to prevent the closing of the upper passage when the valve is forced upward.

In some instances, if desired, valves F of other construction than the above may be used for effecting equivalent results—as, for instance, a spherical valve or ball of rubber or metal, or a combination of such substances, as Figs. 13 and 14; or, again, a disk or key provided with a spring h for pressing it down upon its seat, as Figs. 15 and 16; or a disk having a flanged body K, as Figs. 17 and 18. For large-sized meters the valve can be hinged to swing to and from its seat instead of moving as a puppet.

The size of the delivery-orifices and the amount of head or pressure held back by the valves can be proportioned and arranged for the various sizes of meters, according to the size, situation, required service, and various conditions under which the meters are to work.

The first mouth or orifice 1 being of small size and the weight of the valve within its chamber being such that it opens at a low degree of pressure, the difference of head or force on the inlet side will be strong enough to move the wheel and register by the passing current as it issues from this first opening under the lightest quantity or volume of consumption which the meter is designed to register, and under this condition neither of the other valves will be lifted, as they are weighted to carry higher pressure than the first. When the consumption increases, the flow being more rapid gives greater difference of pressure between the chambers, and this acting in excess of the adjusted resistance of the second valve causes said valve to open, and then allows a stream of greater size to impinge upon the wheel B. Thus throughout the series as a greater duty or volume is demanded by the consumption a larger mouth or orifice or a greater number of said orifices are opened to deliver a greater volume of gas or fluid to the wheel. It will thus be observed that by the means described the meter is rendered capable of automatically enlarging and limiting the volume and velocity of the stream at the various degrees between its maximum and minimum required duty to such proportional relation that the quantity of gas or fluid passing will give an impact momentum or impulse suitable to move the wheel and register at a speed properly corresponding to the flow, whether great or small.

It will be understood that I do not claim, broadly, the feature of a revolving wheel for the purposes of a meter for gas or other fluid, nor the reduction of the actuating-stream in a meter by counter active resistance of a valve or gate, as my invention relates, essentially, to the combination and arrangement of the mouth-pieces and valves, as described, for directing the gas or fluid upon the wheel, and for successively opening under different degrees of pressure.

I claim as my invention, to be secured by Letters Patent—

1. In a rotary meter for gas or fluids, the delivery-nozzle or mouth-piece having the inclined orifice formed for concentrating and directing the stream of gas or fluid, in combination with a chamber anterior to said mouth-piece, having an inlet-passage surrounded by a valve-seat, and the weighted reacting valve disposed within said chamber between the inlet and nozzle for closing against said seat and stopping said inlet-passage in opposition to the entering flow, substantially as and for the purpose set forth.

2. In a gas or fluid meter, the combination of the rotatable measuring-wheel, the delivery mouth-piece having a concentrating-orifice for directing the gas or fluid against said wheel, the valve-chamber beneath said mouth-piece having an inlet-passage with valve-seats, as described, and a valve-puppet loosely disposed within said chamber between the inlet and delivery passages, whereby said delivery-passage is automatically closed when the pressure or active force of the current increases beyond the normal limit of resistance for which said valve is adjusted, substantially as hereinbefore set forth.

3. In a gas or fluid meter, the combination, with the rotatable wheel, of the series of mouth-pieces D, having passages increasing in size in succession, arranged for directing gas or fluid against said wheel for imparting motion thereto, and the series of resistance-valves F, arranged in chambers beneath said mouth-pieces and respectively controlling the passages, said valves being severally weighted or adjusted to resist different degrees of pressure, substantially as and for the purpose set forth.

4. In a gas or fluid meter, the combination, substantially as described, with the body or casing provided with inlet and outlet channels, and the rotatable measuring-wheel mounted within a chamber in the case, of a series of valve-chambers, a series of mouth-pieces having orifices of different caliber fitted to said valve-chambers and respectively disposed for directing a current of gas or fluid against said wheel, and automatic pressure-resisting valves disposed within said valve-chambers, severally weighted or adjusted for resisting different pressures in their relative order as the size of the orifices which they severally control, for the purpose set forth.

Witness my hand this 29th day of December, A. D. 1888.

PHINEHAS BALL.

Witnesses:
CHAS. H. BURLEIGH,
ELLA P. BLENUS.